(12) United States Patent
Wang et al.

(10) Patent No.: US 12,143,666 B2
(45) Date of Patent: Nov. 12, 2024

(54) MULTIMEDIA DEVICE AND RELATED METHOD FOR A VIDEO MUTE MODE

(71) Applicant: MediaTek Singapore Pte. Ltd., Singapore (SG)

(72) Inventors: Xin Wang, San Jose, CA (US); Lulin Chen, San Jose, CA (US); Hsi-Hsin Lee, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 68 days.

(21) Appl. No.: 17/403,865

(22) Filed: Aug. 16, 2021

(65) Prior Publication Data
US 2022/0070525 A1 Mar. 3, 2022

Related U.S. Application Data

(60) Provisional application No. 63/076,975, filed on Sep. 11, 2020, provisional application No. 63/070,346, filed on Aug. 26, 2020.

(51) Int. Cl.
*H04N 21/439* (2011.01)
*H04N 21/44* (2011.01)
*H04N 21/443* (2011.01)
*H04N 21/485* (2011.01)

(52) U.S. Cl.
CPC ... *H04N 21/4396* (2013.01); *H04N 21/44004* (2013.01); *H04N 21/4436* (2013.01); *H04N 21/4854* (2013.01)

(58) Field of Classification Search
CPC ......... H04N 21/4396; H04N 21/44004; H04N 21/4436; H04N 21/4854
USPC .................................................... 348/632
See application file for complete search history.

(56) References Cited

U.S. PATENT DOCUMENTS

| | | | | |
|---|---|---|---|---|
| 5,586,264 | A * | 12/1996 | Belknap | G06F 3/0601 725/115 |
| 6,597,857 | B1 * | 7/2003 | Clapper | H04N 5/775 386/E5.07 |
| 9,250,503 | B2 * | 2/2016 | Tani | G03B 21/16 |
| 2001/0013856 | A1 * | 8/2001 | Hamakada | H04N 5/74 348/E5.127 |
| 2004/0013402 | A1 * | 1/2004 | Takinami | G11B 20/24 386/278 |
| 2008/0273125 | A1 * | 11/2008 | Nishinosono | H05B 41/3927 348/790 |

(Continued)

OTHER PUBLICATIONS

Combined Taiwanese Office Action and Search Report issued on May 30, 2023 in Taiwanese Patent Application No. 110130281, 7 pages.

*Primary Examiner* — John W Miller
*Assistant Examiner* — Sean N. Haiem
(74) *Attorney, Agent, or Firm* — McClure, Qualey & Rodack, LLP

(57) ABSTRACT

A multimedia device is configured to process video data via a related method. The multimedia device includes a processor in communication with a panel. The processor is configured to output the video data to the panel when being switched into a video unmute mode, and further to not output the video data to the panel when being switched into a first video mute mode. The processor is further configured to execute media retrieval and visual processing in response to the first video mute mode.

19 Claims, 17 Drawing Sheets

(56) References Cited

U.S. PATENT DOCUMENTS

| | | | |
|---|---|---|---|
| 2008/0303947 A1* | 12/2008 | Ohnishi | H04N 21/8113 |
| | | | 348/E5.122 |
| 2009/0070810 A1* | 3/2009 | Lee | H04N 21/435 |
| | | | 725/38 |
| 2009/0083799 A1* | 3/2009 | Sakasegawa | H04N 21/426 |
| | | | 725/53 |
| 2011/0316990 A1* | 12/2011 | Saito | H04N 13/359 |
| | | | 348/51 |
| 2012/0200478 A1* | 8/2012 | Kobayashi | G02B 27/017 |
| | | | 345/8 |
| 2012/0201515 A1* | 8/2012 | Kanemaru | H04N 13/183 |
| | | | 386/248 |
| 2013/0155177 A1* | 6/2013 | Mock | H04N 21/42204 |
| | | | 348/E7.078 |
| 2014/0176805 A1* | 6/2014 | Matsuda | H04N 5/63 |
| | | | 348/730 |
| 2018/0103296 A1* | 4/2018 | Zhou | H04N 21/4316 |
| 2019/0268654 A1* | 8/2019 | Huang | H04N 21/4432 |
| 2020/0145726 A1* | 5/2020 | Ciuca | H04N 21/472 |

* cited by examiner

MULTIMEDIA DEVICE AND RELATED METHOD FOR A VIDEO MUTE MODE

CROSS REFERENCE TO RELATED APPLICATIONS

This application claims the benefit of U.S. provisional application No. 63/070,346 (which was filed on Aug. 26, 2020) and U.S. provisional application No. 63/076,975 (which was filed on Sep. 11, 2020). The entire contents of the related application are incorporated herein by reference.

BACKGROUND

Muting audio from video content playback is a very notable feature in TV and video systems and applications, including OTT streaming, gaming and video conferencing. However, in some cases, it is also desirable to 'mute' video to stop showing visual content and only keep audio when playing video content in these systems and applications. For example, when video playback is on and a user or a consumer is working on or occupied with other matters, or even has no intention to watch, there is no need to keep video content visually shown on the display of a multimedia device, system or application, and only audio is needed to be played, possibly as background audio. A specific use case here is to listen, but not watch, a TV news channel or a YourTube clip.

There are a number of reasons why keeping the visual content on the display is not desirable when the user is not interested in watching. First, the display showing the visual content may waste power; in addition, the display showing the visual content may be too bright in dark environments when the user or the consumer sleeps; besides, the user or the consumer may want to keep his/her visual content watching privacy with earphones in crowd public environments, such as in the airplane or the subway; final, the user or the consumer may like to preserve his/her multimedia experience when the network bandwidth is too limited to deliver acceptable video content, e.g., during a live news session or a video conferencing over a mobile network. In these cases, receiving visual content adaptively according to available network bandwidths (e.g., in OTT adaptive streaming) is not helpful, and it is required to not even receive visual content in order to keep communication going. This invention is to provide systems and methods for implementing such video mute in TV and video systems and applications.

SUMMARY

The present invention provides a multimedia device and a related method of switching between at least one video mute mode and a video unmute mode for solving above drawbacks.

According to the claimed invention, the multimedia device is configured to process video data. The multimedia device includes a processor in communication with a panel. The processor is configured to output the video data to the panel when being in or switched into a video unmute mode, and further to not output the video data to the panel when being in or switched into a first video mute mode. The processor is further configured to execute media retrieval and visual processing in response to the first video mute mode.

According to the claimed invention, the processor is further configured to not execute visual processing when being in or switched into a second video mute mode. The processor is further configured to execute media retrieval in response to the second video mute mode.

According to the claimed invention, the processor is further configured to not execute media retrieval and visual processing when being in or switched into a third video mute mode.

According to the claimed invention, the multimedia device further includes a system timer electrically connected to the processor, and the processor is further configured to switch the panel into the video unmute mode or the first video mute mode according to a pre-selected time interval provided by the system timer.

According to the claimed invention, the multimedia device further includes an object detector electrically connected to the processor, and the processor is further configured to switch the panel into the video unmute mode or the first video mute mode according to a pre-selected time interval provided by the system timer and a detection result provided by the object detector.

According to the claimed invention, a method for at least one video mute mode and a video unmute mode in a multimedia device includes analyzing a received command relevant to the a first video mute mode or the video unmute mode, and outputting video data from a processor to a panel of the multimedia device when the received command belongs to the video unmute mode, or stopping outputting the video data from the processor to the panel when the received command belongs to the first video mute mode.

The multimedia device of the present invention can be switched between the video unmute mode and the video mute modes automatically or manually. The multimedia device can shut down the video data transmission between the processor and the panel in response to the video mute modes for saving the power and network bandwidth consumption. In the hot video mute mode, the multimedia device may still execute the media retrieval and the visual processing, to prepare for immediately displaying the visual content; in the warm video mute mode, the multimedia device may execute the media retrieval but not execute the visual processing, to further decrease the unnecessary power consumption; in the cold video mute mode, the multimedia device may not execute the media retrieval and the visual processing to both decrease the power and the unnecessary network bandwidth consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
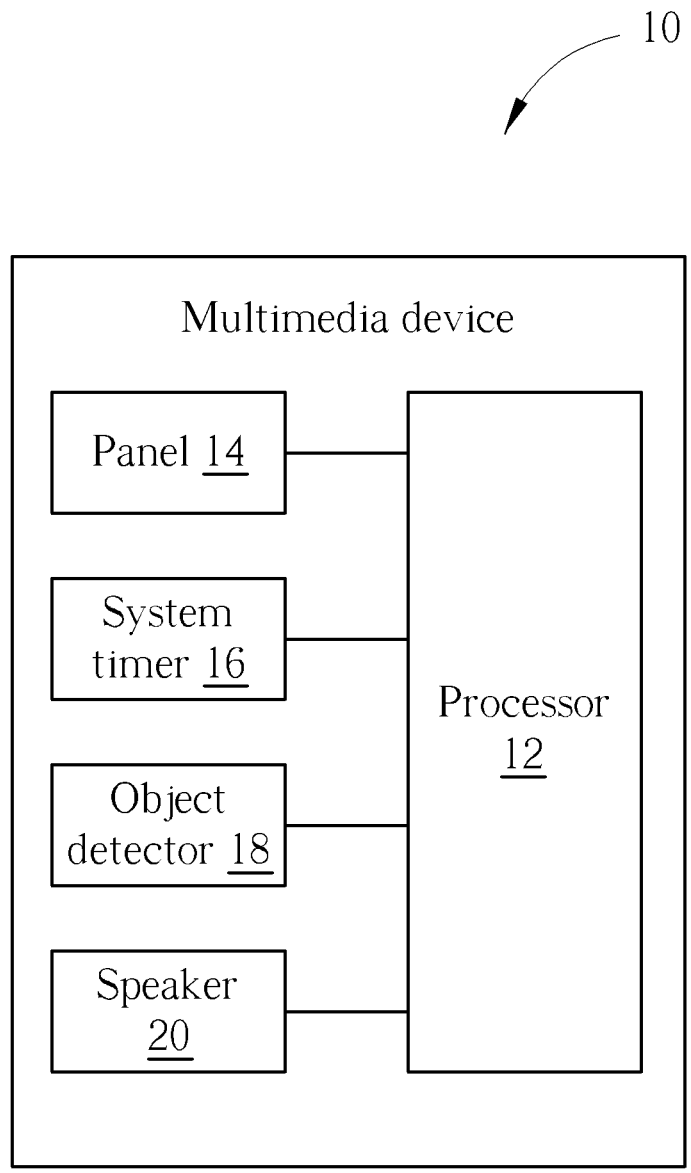
FIG. 1 is a functional block diagram of a multimedia device according to an embodiment of the present invention.

Please refer to FIG. 1. FIG. 1 is a functional block diagram of a multimedia device 10 according to an embodiment of the present invention. The multimedia device 10 may include a processor 12 and a panel 14 in communication with each other, and may further optionally include a system timer 16, an object detector 18 and a speaker 20 in communication with the processor 12. The multimedia device 10 can be configured to process video data and audio data from one or several channels. The panel 14 can be the display/projection panel for visual appreciation or any other device or component for display, and the processor 12 can switch the panel 14 into a plurality of video mute modes and one video unmute mode, so as to increase an attractive feature of the SoC, provide additional user experience, protect public visual content watching privacy, prolong a screen life time of the panel 14, and minimize media service subscriptions.

The processor 12 can output the video data and the audio data respectively to the panel 14 and the speaker 20 when being in or switched into the video unmute mode. If the multimedia device 10 is switched into any of the video mute modes, the processor 12 cannot output the video data to the panel 14, and the audio data still can be transmitted to the speaker 20. In different video mute modes, the processor 12 may optionally execute or not execute media retrieval and visual processing for saving power consumption and network bandwidth, and a detailed description is interpreted in the following illustration.

In the present invention, at least two types of video systems and applications, in terms of how many content delivery channels that these systems and applications use for receiving the video data or multimedia content, can be considered and applied for the multimedia device 10. It should be noticed that video content and multimedia content may be used interchangeably, and the visual content for the video or visual portion of the content is used to distinguish it from audio portion of the content.

Figure 2:
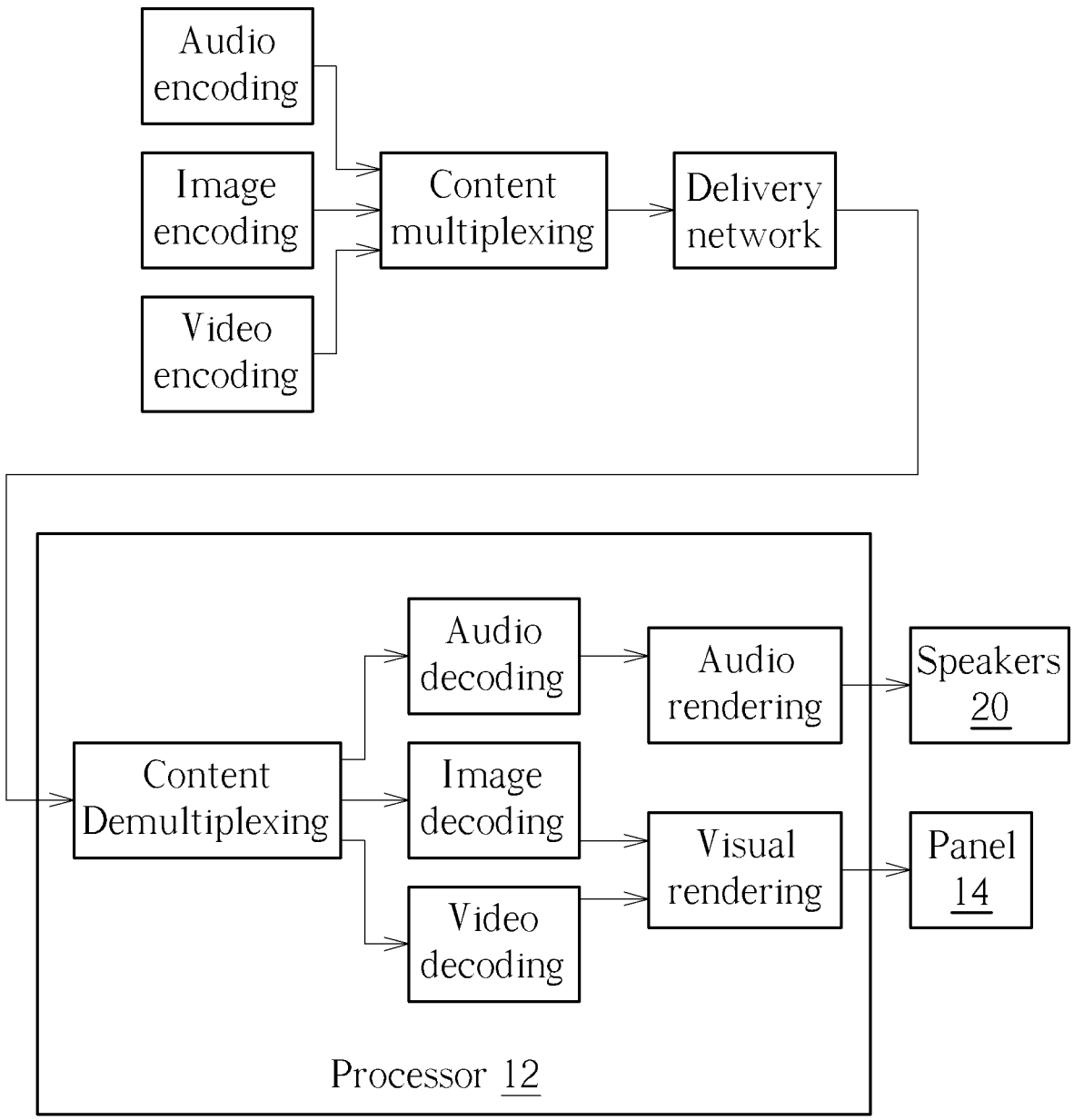
FIG. 2 is a diagram of one type of the video system and application mentioned above according to the embodiment of the present invention.

Please refer to FIG. 2. FIG. 2 is a diagram of one type of the video system and application mentioned above according to the embodiment of the present invention. In a single channel video system or application (e.g., the processor 12 for the television), all multimedia content (such as audio encoding, image encoding and video encoding) can be multiplexed together as a single data stream that is delivered to the system or application via a delivery network. The stream can be then de-multiplexed into different media content streams for decoding and rendering, and then respectively output to the panel 14 and the speaker 20. An important feature of the video system or application shown in FIG. 2 is that different types of the multimedia content delivered to the video system or application (which belongs to the client side) are either all or none. Therefore, the single channel video system may be not suitable for all the plurality of video mute modes in the present invention.

Figure 3:
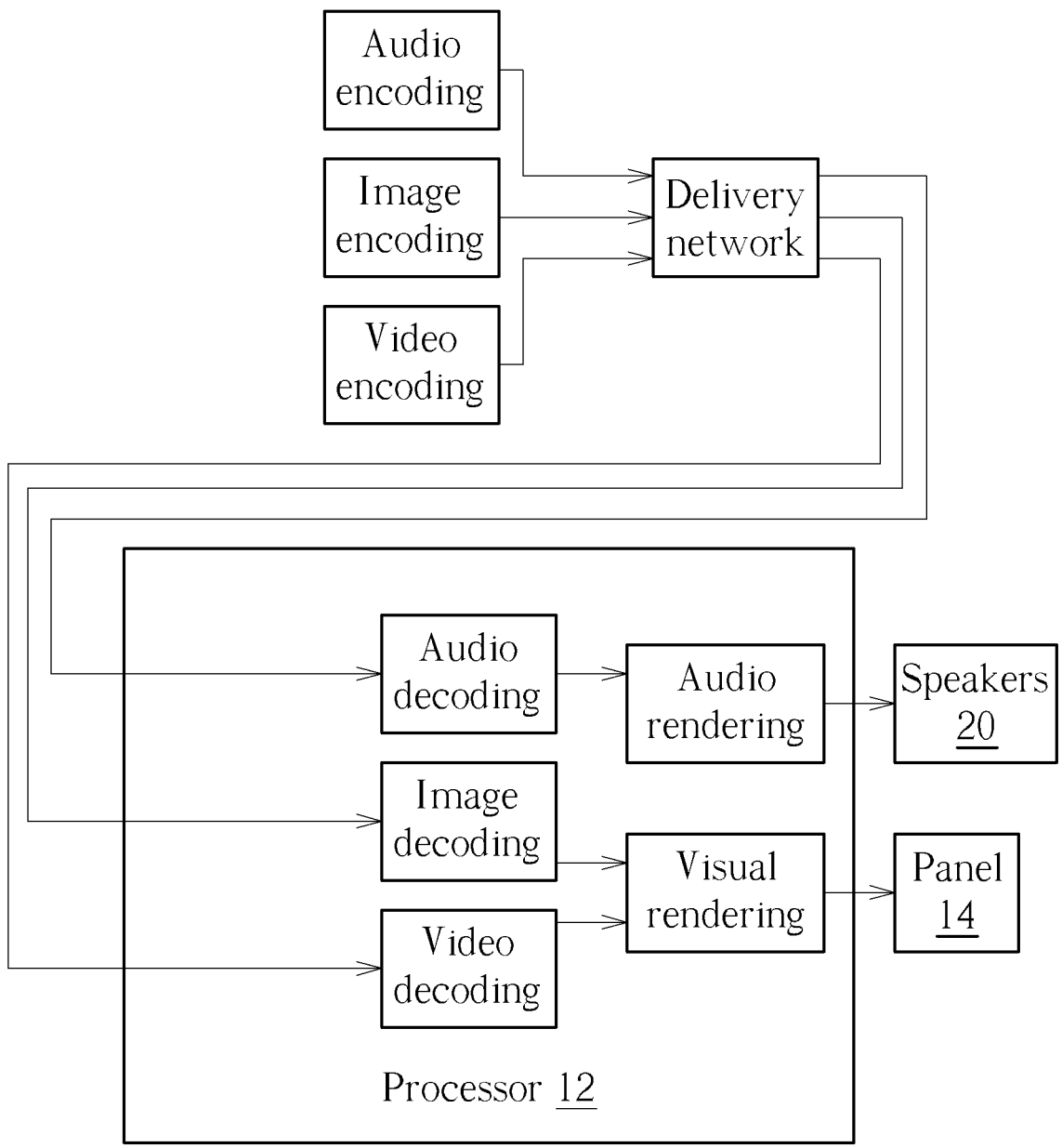
FIG. 3 is a diagram of another type of the video system and application mentioned above according to the embodiment of the present invention.

Please refer to FIG. 3. FIG. 3 is a diagram of another type of the video system and application mentioned above according to the embodiment of the present invention. In a multiple channel video system or application (e.g., the processor 12 for the over-the-top streaming), each type of multimedia content (such as the audio encoding, the image encoding and the video encoding) can form their own single data stream to be separately delivered to the system or application via the delivery network. The streams of different types can then be processed separately for decoding and rendering, and then respectively output to the panel 14 and the speaker 20. An important feature of this kind of system or application shown in FIG. 3 is that different types of the multimedia content delivered to the video system or application (which belongs to the client side) can be separately in an either synchronous or asynchronous manner. Thus, the multiple channel video system or application may be suitable for all the plurality of video mute modes in the present invention.

Figure 4:
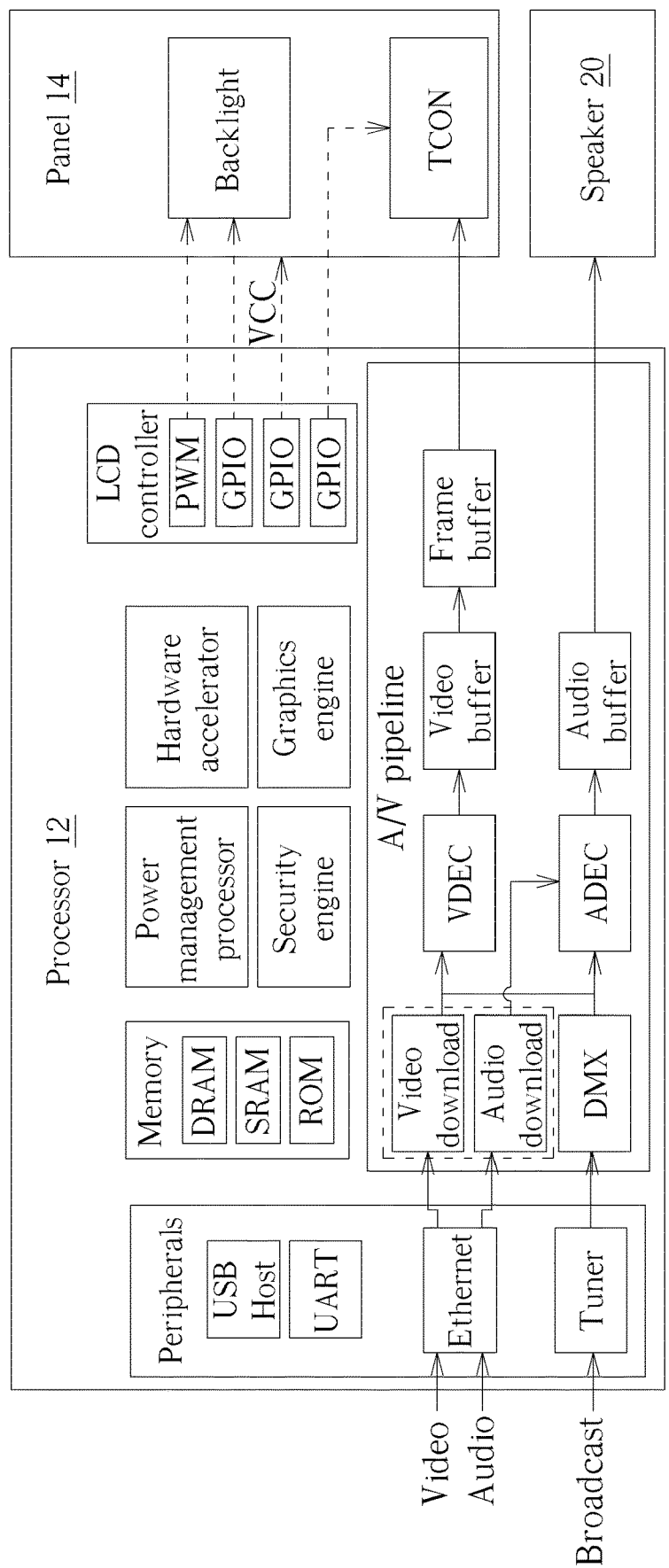
FIG. 4 is an architecture diagram of the multimedia device in the video unmute mode according to the embodiment of the present invention.
Figure 5:
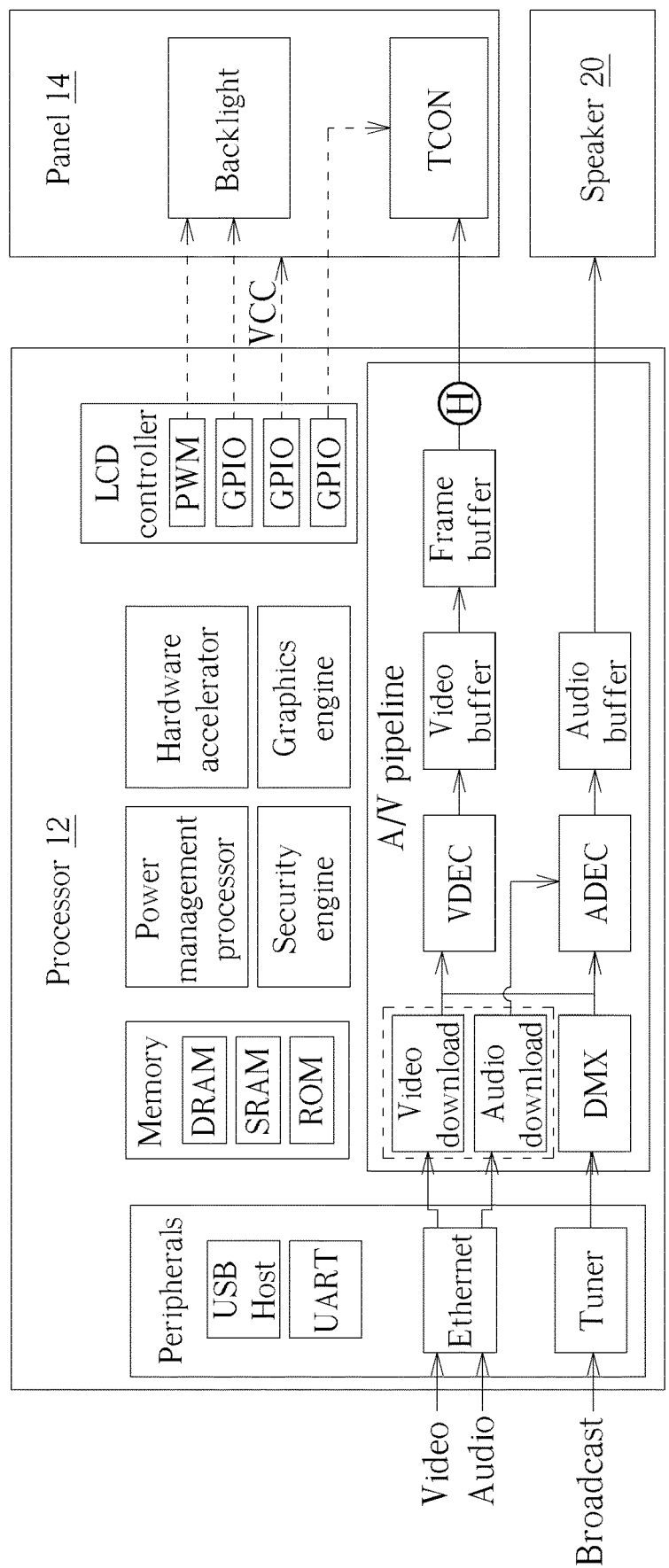
FIG. 5 is an architecture diagram of the multimedia device in the first video mute mode according to the embodiment of the present invention.
Figure 6:
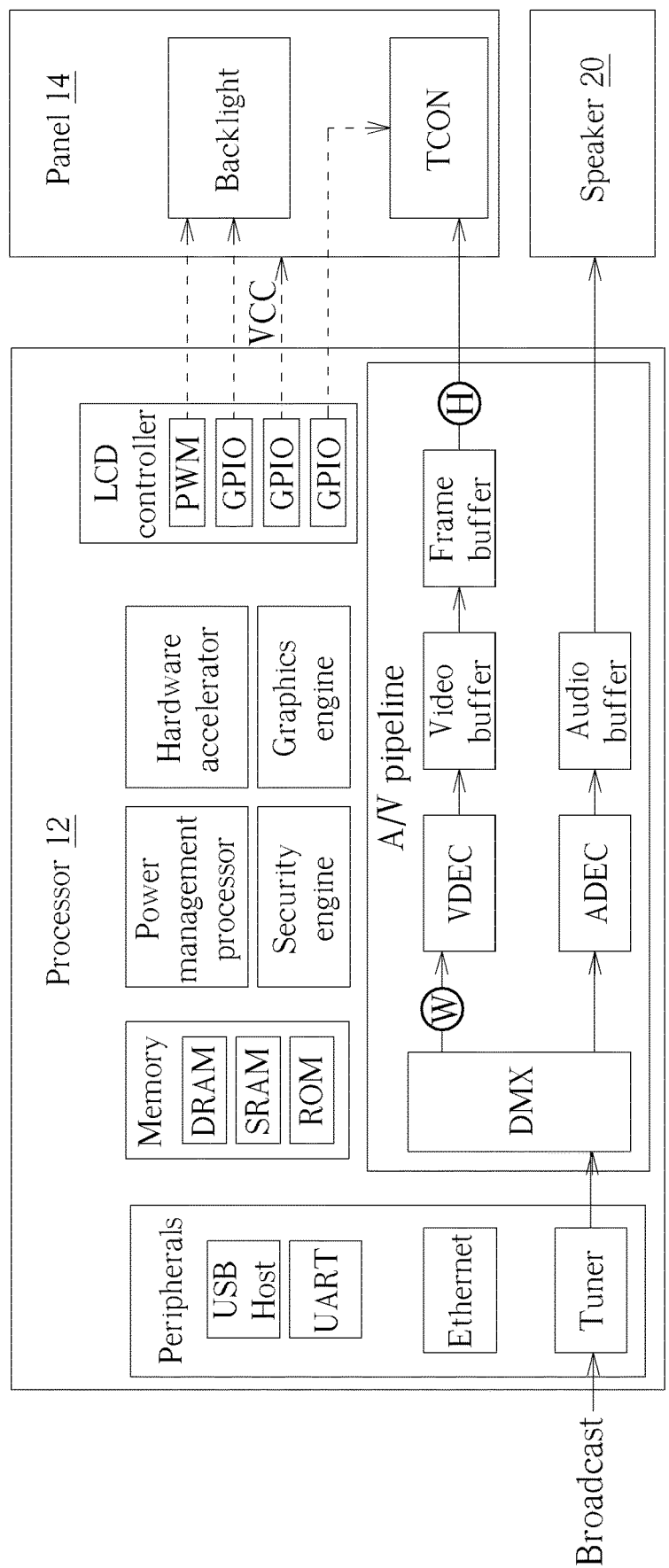
FIG. 6 is an architecture diagram of the multimedia device in the second video mute mode according to the embodiment of the present invention.
Figure 7:
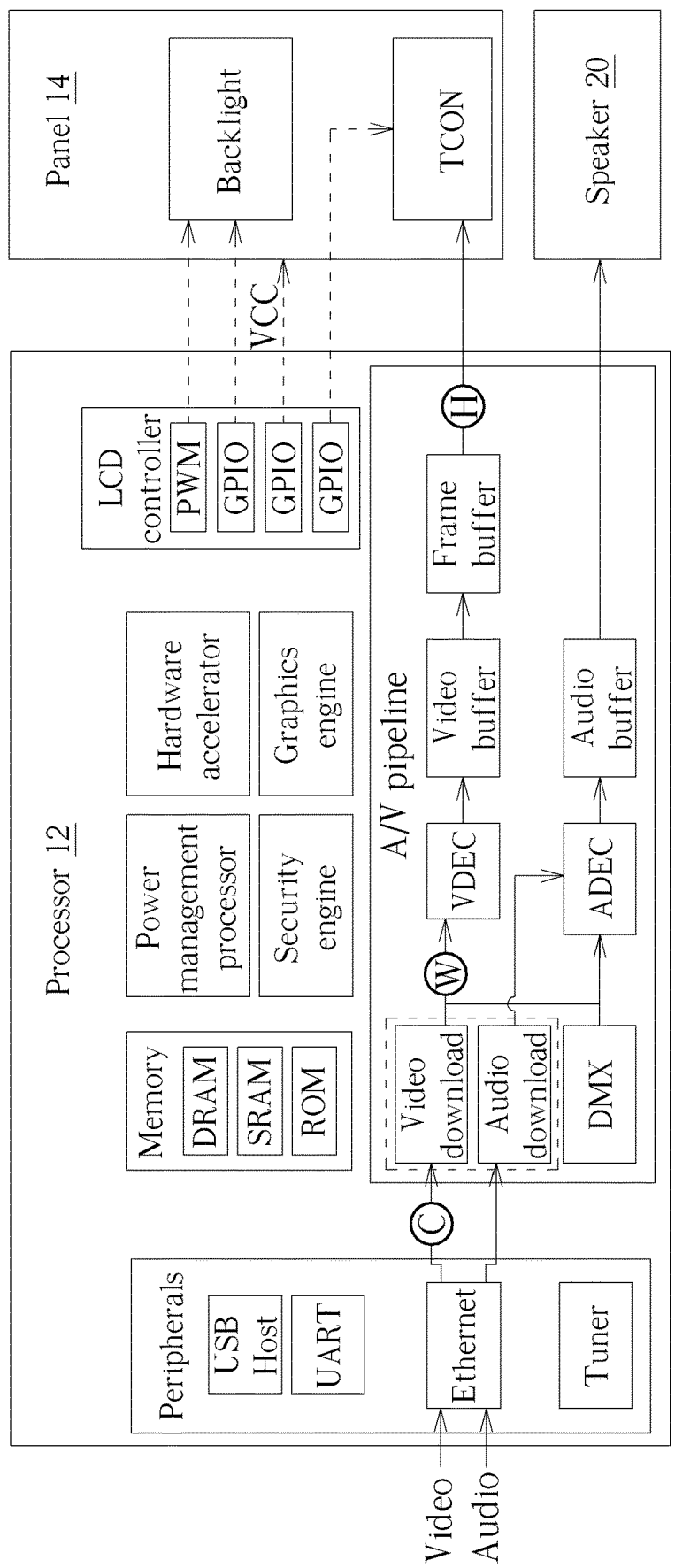
FIG. 7 is an architecture diagram of the multimedia device in the third video mute mode according to the embodiment of the present invention.

The multimedia device 10 may at least include a first video mute mode, a second video mute mode and a third video mute mode. Please refer to FIG. 4 to FIG. 7. FIG. 4 is an architecture diagram of the multimedia device 10 in the video unmute mode according to the embodiment of the present invention. FIG. 5 is an architecture diagram of the multimedia device 10 in the first video mute mode according to the embodiment of the present invention. FIG. 6 is an architecture diagram of the multimedia device 10 in the second video mute mode according to the embodiment of the present invention. FIG. 7 is an architecture diagram of the multimedia device 10 in the third video mute mode according to the embodiment of the present invention.

The processor 12 may be the system on a chip (SoC) of the television. In the video unmute mode shown in FIG. 4, the processor 12 can output the video data and the audio data respectively to the panel 14 and the speaker 20. According to the above-mentioned SoC architecture together with the integrated display panel 14 and the audio speaker 20, three TV set related embodiments are illustrated and shown in FIGS. 5-7, according to whether video mute depends on input video sources of the TV system: broadcast (via Tuner) and OTT (via Ethernet). It should be mentioned that functional blocks appeared in the figures but not mentioned in the present invention belong to the conventional skill, and a detailed description is omitted herein for simplicity.

In the first video mute mode shown in FIG. 5, the LCD controller in this kind of TV system can have several interfaces used to control the multimedia content displayed on the panel 14. The said interfaces can refer to Table 1 as mentioned below. Thus, a procedure for switching into the first video mute mode, which may be implemented as hot video mute, can use these interfaces to dim and turn off the panel. For example, a pulse-width modulation (PWM) signal can be used to dim a backlight module (Backlight) of the panel 14 gradually or instantly; general purpose input/output (GPIO) can be controlled to turn off the backlight module (Backlight) and a power supply (which is not shown in the figures) of the panel 14. Besides, the GPIO may switch off the TCON signal input from a timing controller (TCON) of the panel 14 and then shut down the SoC signal output.

In the first video mute mode, the processor 12 can receive the audio data via a network connector (such as Ethernet or Tuner), and output the audio data from an audio buffer to the speaker 20, so that the multimedia device 10 can stop showing the visual content and only keep audio content when playing the video content.

| Interface | Control path | Note |
| --- | --- | --- |
| PWM | LCD controller-panel backlight | Pulse Width Modulation Use PWM signal to control the way to light up the backlight. (instant or gradually) |
| GPIO | LCD controller-panel backlight | To turn on/off the panel backlight |
| GPIO | LCD controller-panel VCC | To turn on/off the panel power supply |
| GPIO | LCD controller-panel TCOM | To turn on/off the signal from TV SoC |

Correspondingly, a procedure for switching from the first video mute mode (which means the hot video mute) into the video unmute mode can initialize the SoC signal output, and the power supply of the panel 14 can be turned off via the GPIO. Then, the SoC signal output can be resumed to enable the TCON signal input via the GPIO, and the GPIO can be controlled to turn on the backlight module of the panel 14 and the PWM signal can be used to light up the backlight module of the panel 14. Therefore, the processor 12 can execute the media retrieval and the visual processing, and shut down data transmission between the panel 14 and a frame buffer of the processor 12 in response to the first video mute mode; the hot video mute and unmute point (H) on the video path can be illustrated in FIG. 5.

In the second video mute mode shown in FIG. 6, when the video content of the television comes from broadcast input via the network connector (such as Tuner), the video mute and the video unmute can be further implemented as warm video mute and unmute, on top of the hot video mute and unmute. A procedure for switching into the warm video mute can be starting the hot video mute mode, and then stopping video decoding via a video decoder (VDEC) and feeding decoded video into a video buffer and a frame buffer of the processor 12. That is, the processor 12 can execute the media retrieval but not execute the visual processing in response to the second video mute mode, for limiting the data transmission between a data memory (DMX) and the video decoder; meanwhile, the data transmission between the panel 14 and the frame buffer can be shut down due to starting of the hot video mute.

Correspondingly in a reversed manner, a procedure for switching from the second video mute mode (which means the warm video mute) into the video unmute mode can resume the video decoding via the video decoder and feeding the decoded video into the video buffer and a frame buffer of the processor 12. Then, the foresaid procedure for switching from the first video mute mode (the hot video mute) into the video unmute mode can be executed. The warm video mute and unmute point (W) on the video path can be illustrated in FIG. 6.

In the third video mute mode shown in FIG. 7, when the video content of the television comes from the OTT (over the top) streaming via Ethernet, the video mute and unmute can be further implemented as cold video mute and unmute, on top of the warm and hot video mutes and unmutes. A procedure for switching into the cold video mute is starting the warm video mute, and then stopping downloading the video data via a video downloader of the processor 12; that is to say, the processor 12 cannot execute the media retrieval and the visual processing in response to the third video mute mode. As in the third video mute mode, the processor 12 can stop the video decoding via the video decoder and feeding the video data into the video buffer and the frame buffer, for shutting down the down data transmission between the panel 14 and the frame buffer.

Correspondingly in the reversed manner, a procedure for switching from the third video mute mode (the cold video mute) into the video unmute mode can resume download the video data via the video downloader, and the foresaid procedure for switching from the second video mute mode (the warm video mute) into the video unmute mode can be continuously executed. The cold video mute and unmute point (C) on the video path can be illustrated in FIG. 7.

As shown in FIG. 5, FIG. 6 and FIG. 7, the dotted arrow line can be interpreted as the path of a control signal, and the solid arrow line can be interpreted as the path of data transmission, and the symbol H can be interpreted as a node of the hot video mute and unmute, and the symbol W can be interpreted as a node of the warm video mute and unmute, and the symbol C can be interpreted as a node of the cold video mute and unmute.

In the present invention, at least one of the system timer 16 and the object detector 18 can be used to switch the video mute and unmute. In one possible embodiment, the video mute and unmute can also be only activated through the system timer 16. In some cases, this can be configured through the system setting using the system timer 16, to trigger the video mute on or off in a pre-selected time interval provided by the system timer 16. For instance, a sleep video mute and wake-up video unmute can be set to start at 11:30 pm and then at 7:00 am, respectively. In addition, the first video mute mode may be switched on at 11:30 pm, and the second video mute mode may be switched on at 11:40 pm, and the third video mute mode may be switched on at 11:50 pm, automatically.

Another timer-based video mute can be according to some idle time interval of user interactivity. For instance, when the multimedia device 10 equipped with object detector 18 detects no one is watching the TV in, say 30 minutes, it will start to inform the user on the panel 14 that the TV is going to start to "fade to black" for the video mute in, say, 1 minute; during this counting down interval, the user can interact with the multimedia device 10 by touching any key on the remote control to disable to the video mute. The object detector 18 may be an optical detector such as a camera, or an acoustic detector such as a microphone. Note that this video mute counting down is different from the conventional TV idle counting down in some TV sets, where there will be no video and no audio after no interaction from the remote control, say in 2 hours.

In the present invention, this kind of "fade to black in 60 seconds" counting down for the video mute, or counting up for the video unmute, can be implemented with any pre-determined video mute or unmute. In other words, if only the system timer 16 is applicable, the processor 12 can switch the panel 14 between the video unmute mode and at least one of the video mute modes according to the pre-selected time interval provided by the system timer 16; if the system timer 16 and the object detector 18 are both applicable, the processor 12 can switch the panel 14 between the video unmute mode and at least one of the video mute modes according to the pre-selected time interval provided by the system timer 16 and a detection result provided by the object detector 18.

Moreover, the processor 12 may further switch the panel 14 between the first video mute mode, the second video mute mode and the third video mute mode according to the pre-selected time interval and/or the detection result. For instance, a more general timer-based video mute is an auto (multi-stage) video mute that relies on the system timer 16 to enable and control switching among different video mute modes. When the auto video mute mode is turned on, the video mute can go from the hot video mute mode to the warm video mute mode and even to the cold video mute mode. A schedule for this auto video mute can be divided into stages in order to save processing power and network traffic in some pre-determined manner. For instance, the first stage would be a stage of the hot video mute mode. If there is no user interaction to unmute the video data within the pre-determined time interval, say, 5 minutes, then it enters the second stage of the warm video mute mode. If there is still no user interaction to unmute the video data, then it enters the third stage of the cold video mute mode.

Further, the processor 12 may analyze a label within the video data for triggering one of the hot video mute mode, the warm video mute mode and the cold video mute mode. In any case, some on-screen indication of muting status can be presented to show which mode the video mute is. The said on-screen indication may be an indicator light for power stand-by, and the indicator light can be switched to show red color, yellow color and blue color for respectively representing the hot video mute mode, the warm video mute mode and the cold video mute mode.

Figure 8:
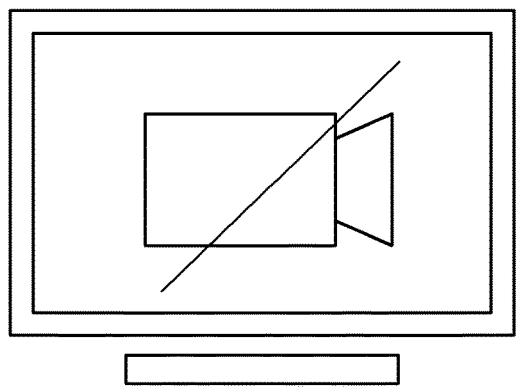
FIG. 8 to FIG. 10 are diagrams of different icons for the generic video mute according to the embodiment of the present invention.
Figure 9:
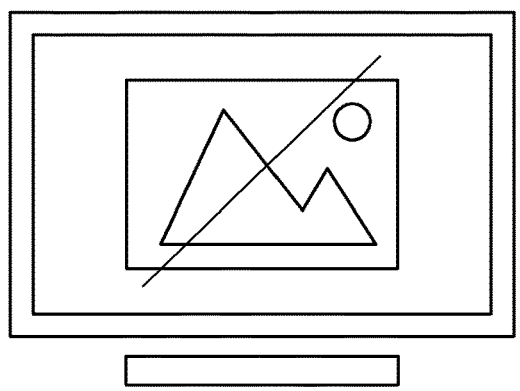
Figure 10:
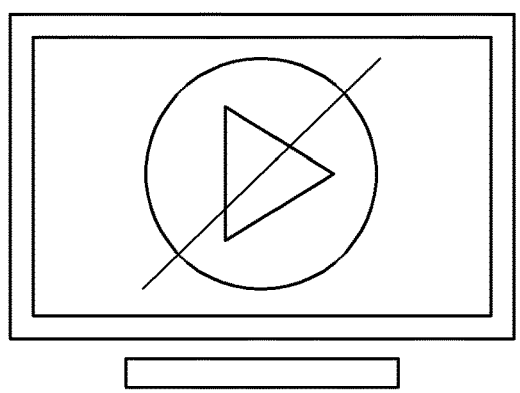

In the present invention, three modes of the video mute: the hot video mute mode, the warm video mute mode and the cold video mute mode, can depend on where in the video processing path, the visual content is not displayed, decoded and rendered, and retrieved. It should be noted that more modes of the video mute can be defined and implemented depending on more specific requirements. Please refer to FIG. 8 to FIG. 10. FIG. 8 to FIG. 10 are diagrams of different icons for the generic video mute according to the embodiment of the present invention. The exemplar icons are for the purpose of illustration, and any similar ones that meet the descriptions of the video mute modes will serve the purpose. Nevertheless, the first set of the exemplar icons shown in FIG. 8 can be used to throughout the rest of this invention to illustrate the respective video modes.

The icon shown in FIG. 8 can represent that no video showing on the panel 14 of the multimedia device 10, and no indication on how the generic video mute is implemented in the multimedia device 10. The generic video mute may be further implemented by one of the next three modes.

Figure 11:
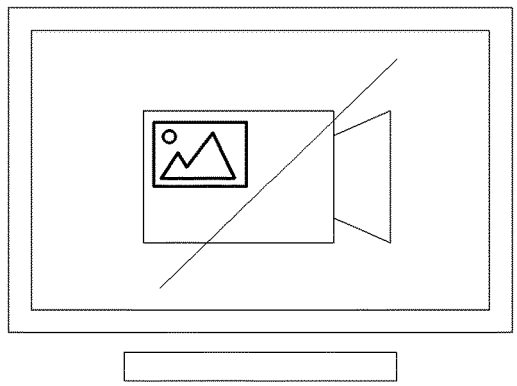
FIG. 11 to FIG. 13 are diagrams of different icons for the hot video mute according to the embodiment of the present invention.
Figure 12:
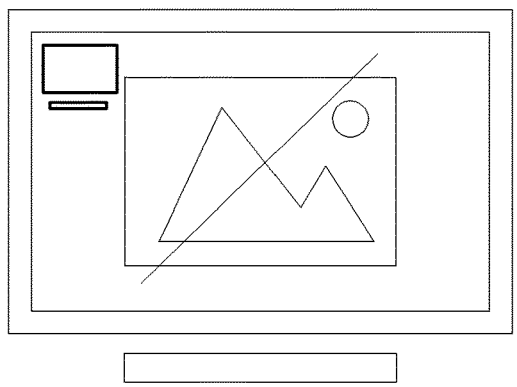
Figure 13:
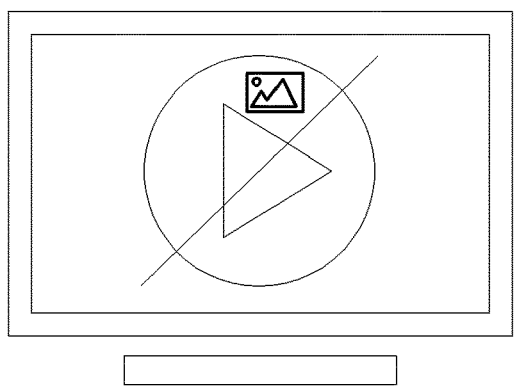
Figure 14:
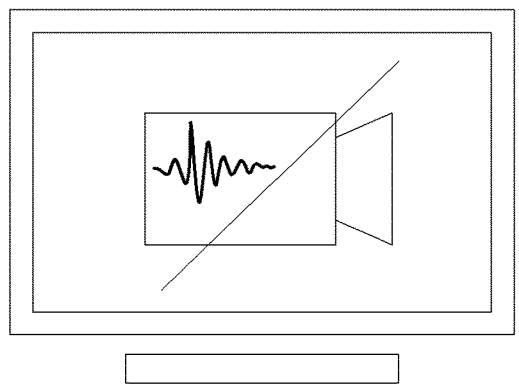
FIG. 14 to FIG. 16 are diagrams of different icons for the warm video mute according to the embodiment of the present invention.
Figure 15:
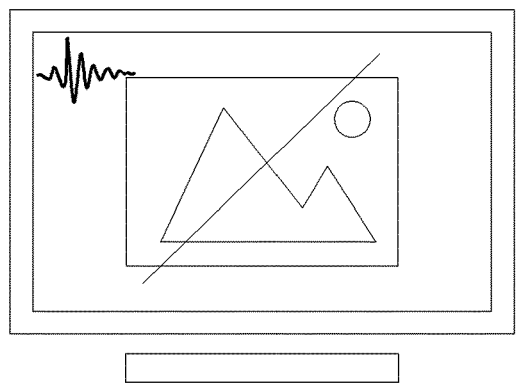
Figure 16:
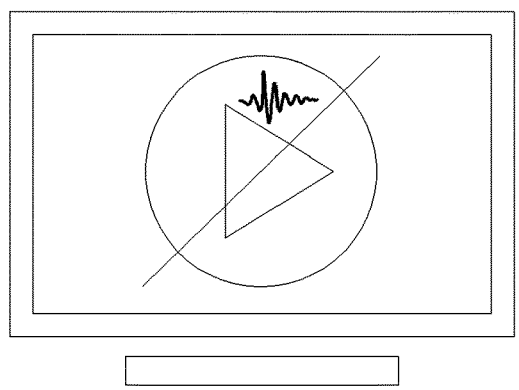
Figure 17:
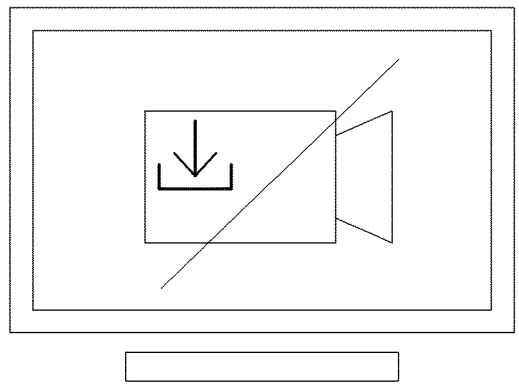
FIG. 17 to FIG. 19 are diagrams of different icons for the cold video mute according to the embodiment of the present invention.
Figure 18:
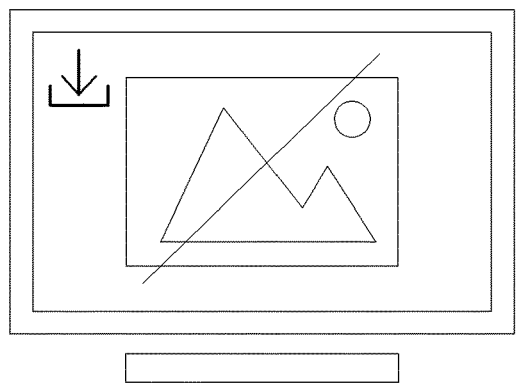
Figure 19:
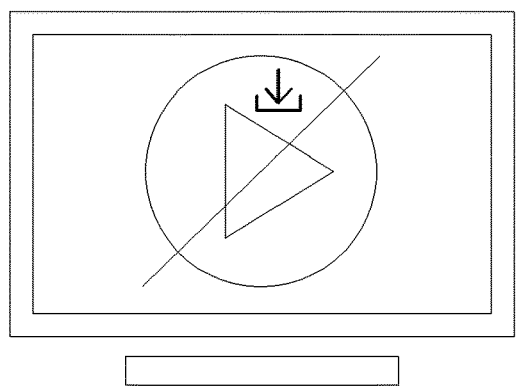
Figure 20:
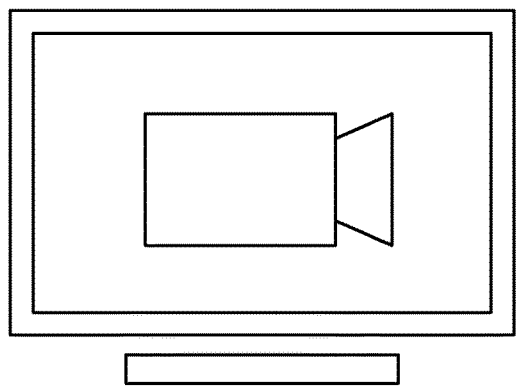
FIG. 20 to FIG. 22 are diagrams of different icons for the video unmute according to the embodiment of the present invention.
Figure 21:
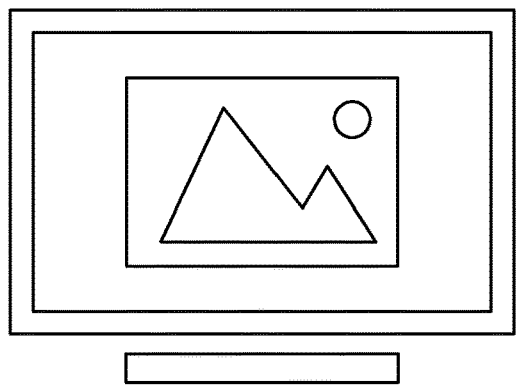
Figure 22:
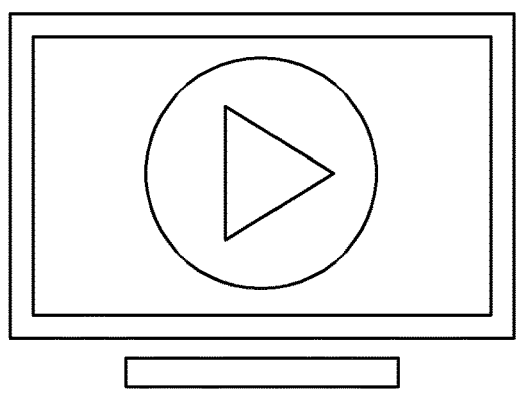

Please refer to FIG. 11 to FIG. 22. FIG. 11 to FIG. 13 are diagrams of different icons for the hot video mute according to the embodiment of the present invention. FIG. 14 to FIG. 16 are diagrams of different icons for the warm video mute according to the embodiment of the present invention. FIG. 17 to FIG. 19 are diagrams of different icons for the cold video mute according to the embodiment of the present invention. FIG. 20 to FIG. 22 are diagrams of different icons for the video unmute according to the embodiment of the present invention.

In the hot video mute shown in FIG. 11 to FIG. 13, the video processing can be as usual, which means the visual content is still retrieved and processed as decoding and rendering, but stop at not showing the visual content on the panel 14. Whenever the video data is unmuted from the hot video mute mode, the visual content can be displayed immediately, because the rendered visual content can be always available within the multimedia device 10. However, the hot video mute mode in the present invention is power and bandwidth consuming, so that the hot video mute may indicate heat being still generated due to the power and bandwidth consuming of the multimedia device 10.

In the warm video mute shown in FIG. 14 to FIG. 16, there has no video showing on the panel 14 by stopping processing of the retrieved visual content, which means not processing the visual content that is retrieved to the multimedia device 10. In other words, the visual content can be retrieved and stored in some buffer of the multimedia device 10, but not decoded and rendered, and hence not displayed. Whenever the video data is unmuted from the warm video mute mode, the buffered visual content can be decoded and rendered immediately and then displayed. The warm video mute mode can impose minimum delay in showing the visual content on the panel 14 relative to the hot video mute mode that the visual content needs time to be decoded and rendered. Though the warm video mute mode can save processing power consumption, it is still bandwidth consuming, and may have some delay in the video unmute due to the visual content processing.

In the cold video mute shown in FIG. 17 to FIG. 19, there has no video showing on the panel 14 by stopping downloading of the visual content, which means not retrieving or downloading of the visual content to the multimedia device 10. In other words, the visual content cannot be retrieved, and hence not decoded, rendered, and displayed. Whenever the video data is unmuted from the cold video mute mode, the visual content needs to be retrieved in a way that is synchronized with the audio content in order to display the visual content matching its corresponding audio. Clearly, there may be some delay in showing the visual content on the panel 14 relative to the warm video mute mode and the hot video mute mode, and the visual content needs time to retrieve, decode and render. However, the cold video mute mode can be most efficient in terms of power and bandwidth consumptions.

In the video unmute shown in FIG. 20 to FIG. 22, the video mute mode is turned off or switched off for showing the visual content back onto the panel 14 of the multimedia device 10. The procedure of switching from the video mute mode to the video unmute mode can be set in accordance with the remote control, the system setting, the voice/visual/gesture control, the touch module of the panel 14, the camera detection result for facial presence, the system condition triggered, or the network condition changes.

The multimedia device 10 can have one or several video mute interfaces. The video mute interface can be a way for the user to interact with the embodiments in the present invention to indicate a desire or make a request of the video mute, so the multimedia device 10 can meet the desire or fulfill the request in some appropriate manner.

As an example of using the remote control, one way to enable the video mute is to use the mute button on the remote control equipped with the television that supports the long press or double press function. When the mute button is pressed shortly, it mutes or unmutes the audio data, which preserves the conventional audio muting experience. However, when the mute button is long pressed or double pressed, a pop-up window can be displayed on the panel 14 to allow the user to select a kind from a number of possible mute options. The indication of the options can be graphic icons or visual text.

Figure 23:
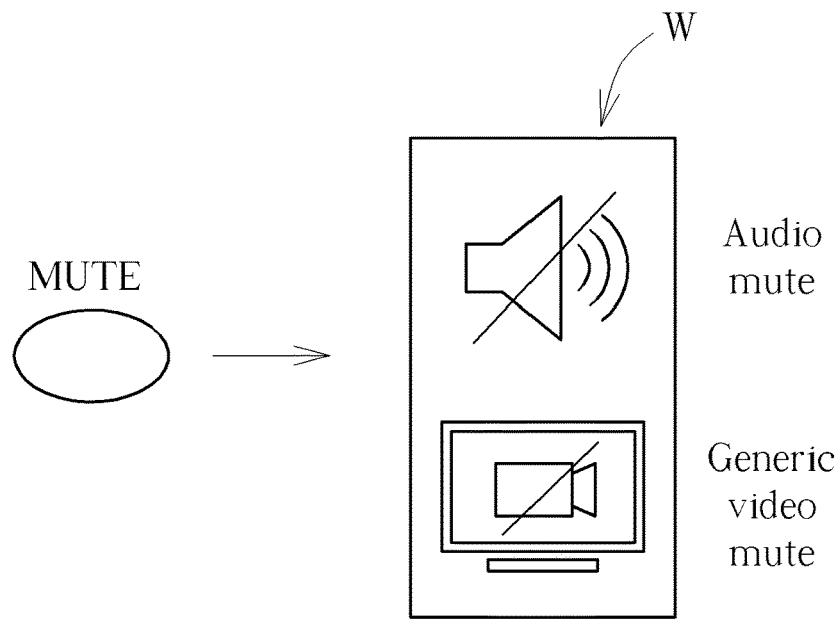
FIG. 23 is a diagram of operation between the generic video mute and unmute according to the embodiment of the present invention.
Figure 24:
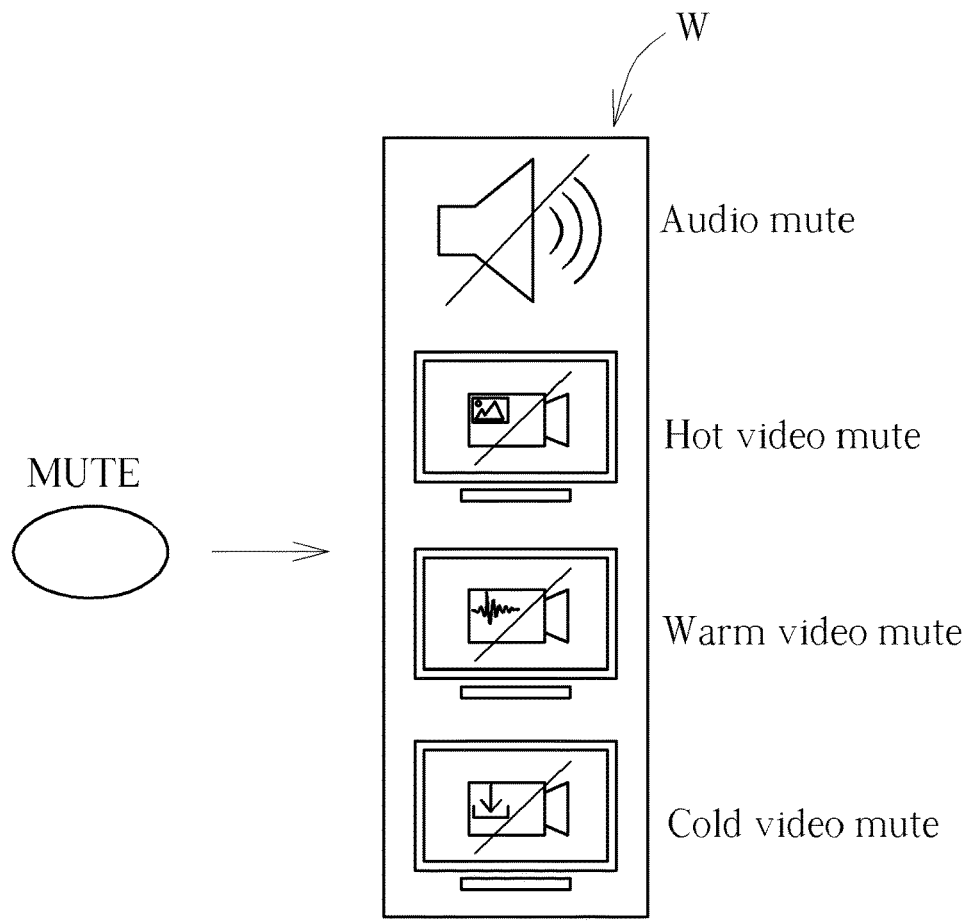
FIG. 24 is a diagram of operation between the hot/warm/cold video mute and unmute according to the embodiment of the present invention.

Please refer to FIG. 23 and FIG. 24. FIG. 23 is a diagram of operation between the generic video mute and unmute according to the embodiment of the present invention. FIG. 24 is a diagram of operation between the hot/warm/cold video mute and unmute according to the embodiment of the present invention. In one case shown in FIG. 23, the pop-up window W can show two options for the user to select: one for the audio mute and unmute, and the other for the generic video mute and unmute. In another case shown in FIG. 24, the pop-up window W can show four options for the user to select: one for the audio mute and unmute, and the other threes for the hot video mute and unmute, the warm video mute and unmute, and the cold video mute and unmute. Types and numbers of the audio and video mute/unmute are not limited to the above-mentioned embodiment, and depend on an actual demand.

Figure 25:
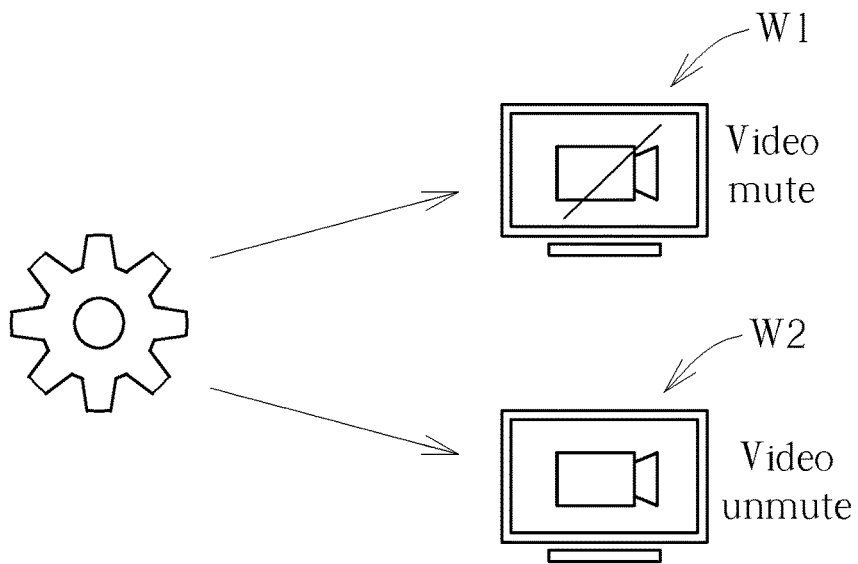
FIG. 25 is a diagram of operation between the generic video mute and unmute according to the embodiment of the present invention.
Figure 26:
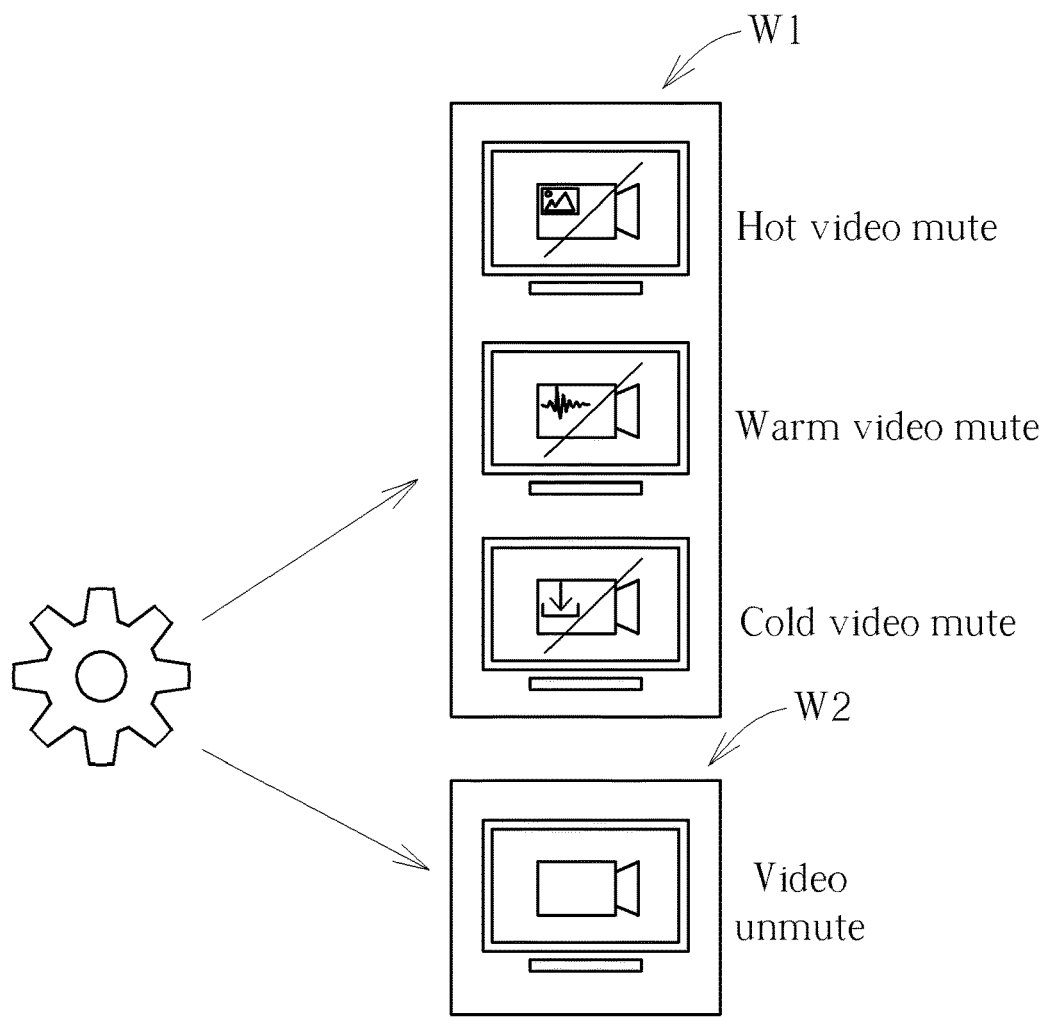
FIG. 26 is a diagram of operation between the hot/warm/cold video mute and unmute according to the embodiment of the present invention.

As an example of using the system setting, the video mute can be set by going through an option in system settings of the multimedia device 10, in a similar manner as turning on and off captions. Please refer to FIG. 25 and FIG. 26. FIG. 25 is a diagram of operation between the generic video mute and unmute according to the embodiment of the present invention. FIG. 26 is a diagram of operation between the hot/warm/cold video mute and unmute according to the embodiment of the present invention. In the case shown in FIG. 25, the pop-up menu window W1 can come up within the system settings to present an icon or textual option for turning on the video mute mode. To switch into the video unmute mode, another pop-up menu window W2 can come up within the system setting to present an icon or textual option for turning off the video mute mode. In another case shown in FIG. 26, the pop-up menu window W1 can come up within the system settings to present icons or textual options for turning on one particular video mute mode. To switch into the video unmute mode, the pop-up menu window W2 can come up within the system setting to present an icon or textual option for turning off the video mute mode.

Figure 27:
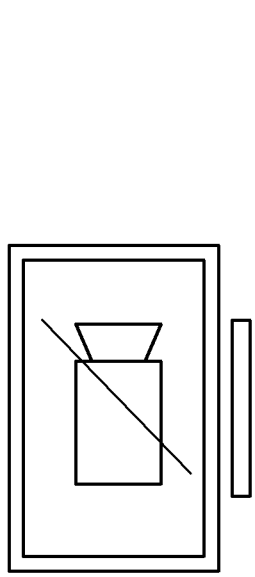
FIG. 27 and FIG. 28 are diagrams of operation between the video mute and unmute according to different embodiments of the present invention.
Figure 27:
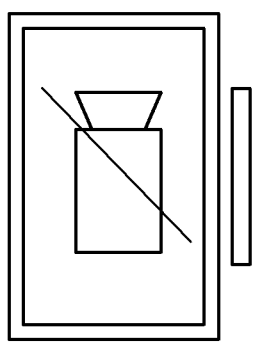
Figure 28:
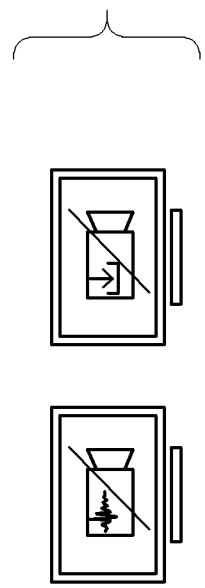
Figure 28:
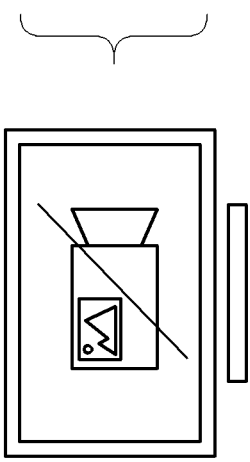
Figure 28:
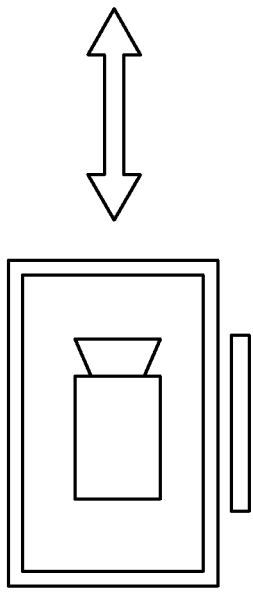

As an example of using on-screen selection of the touch module, the multimedia device 10 which allows direct on-screen user interactions can offer several interactive icons to indicate the current video mute status and allow for switching between the video mute (or any mode of the video mute) and the video unmute mode. Please refer to FIG. 27 and FIG. 28. FIG. 27 and FIG. 28 are diagrams of operation between the video mute and unmute according to different embodiments of the present invention. In the embodiment shown in FIG. 27, the icon can be touched to switch the multimedia device 10 into the video mute mode or the video unmute mode. In the embodiment shown in FIG. 28, the icon may be shortly touched or once touched to switch into the video mute mode or the video unmute mode, and further may be long touched or twice touched to show the sub-icons for selecting and switching into the hot video mute mode, the warm video mute mode or the cold video mute mode.

Figure 29:
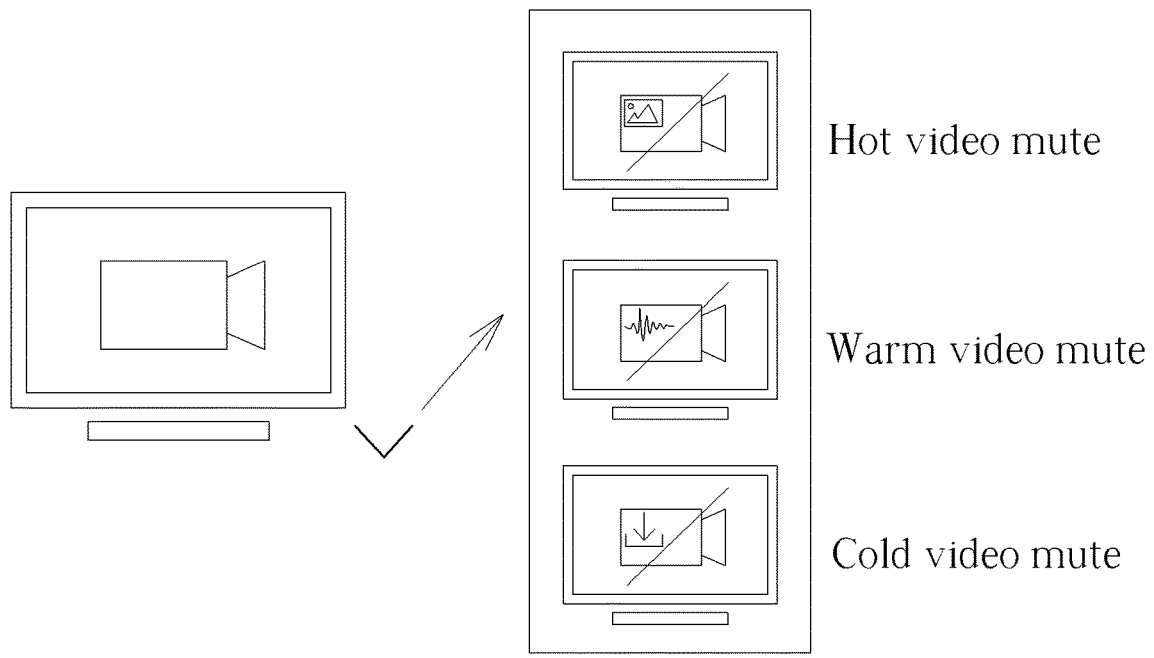
FIG. 29 and FIG. 30 are diagrams of the icons with the expanded menu according to different embodiments of the present invention.
Figure 30:
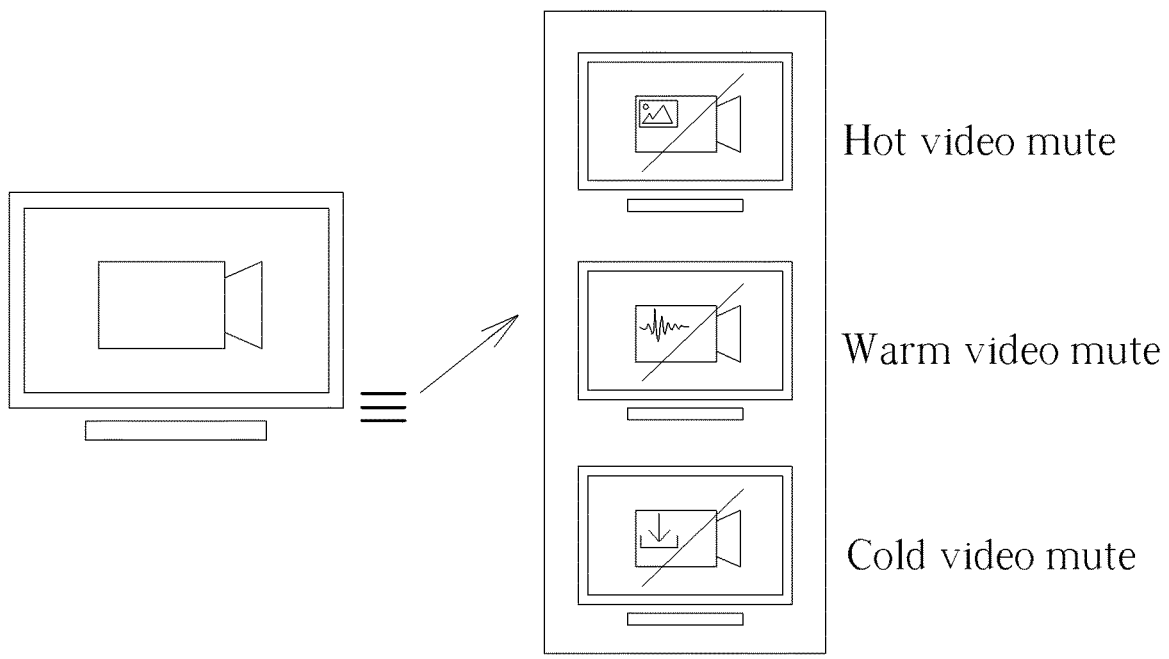

In order to enable choosing different mute modes, the icons with an expanded menu can be presented. Please refer to FIG. 29 and FIG. 30. FIG. 29 and FIG. 30 are diagrams of the icons with the expanded menu according to different embodiments of the present invention. The icons may have a mark for actuation of the expanded menu, such as the hook mark shown in FIG. 29 or the list mark shown in FIG. 30. While clicking on the video unmute icon switches to the video mute mode, the foresaid mark can be clicked on to show the expanded menu, so as to provide more video mute modes (which mean the hot video mute mode, the warm video mute mode and the cold video mute mode) for the user to select.

Figure 31:
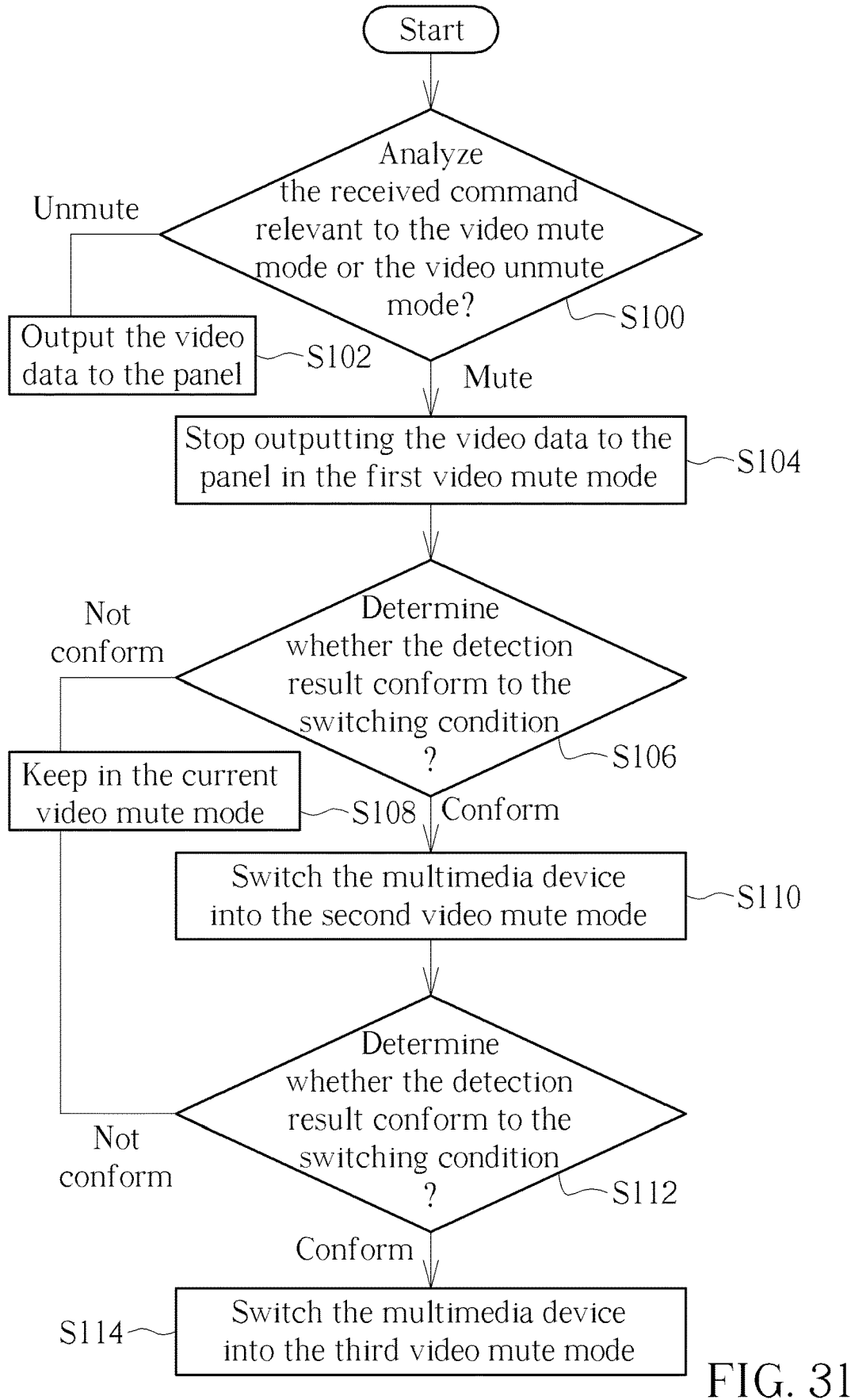
FIG. 31 is a flow chart of a method for switching the video mute mode and the video unmute mode according to the embodiment of the present invention.

Please refer to FIG. 31. FIG. 31 is a flow chart of a method for switching the video mute mode and the video unmute mode according to the embodiment of the present invention. The method illustrated in FIG. 31 can be suitable for the multimedia device 10 shown in FIGS. 1-7. First, step S100 can be executed to acquire and analyze a received command being relevant to the video mute mode or the video unmute mode. The received command may be acquired in accordance with the remote control, the system setting, the voice/visual/gesture control, the touch module, the camera detection result for facial presence, the system condition triggered, or the network condition changes.

If the received command belongs to the video unmute mode, step S102 can be executed to output the video data from the processor 12 to the panel 14, and thus the multimedia device 10 can display the video data and the audio data simultaneously; if the received command belongs to the video mute mode, step S104 can be executed to stop outputting the video data from the processor 12 to the panel 14, so the multimedia device 10 can play the audio data only. In step S104, the multimedia device 10 is switched into the first video mute mode, and the media retrieval and the visual processing are still executed; when the multimedia device 10 is unmuted, the visual content can be displayed immediately, however the hot video mute mode is power and bandwidth consuming.

Then, step S106 can be continuously executed to analyze a detection result of at least one detector. The detector may be the system timer 16 or the object detector 18, or may be the remote control or the touch module, or may be the system condition triggered or the network condition changes. If the detection result does not conform to a specific switching condition, step S108 can be executed to keep the multimedia device 10 in the current video mute mode. If the detection result conforms to the specific switching condition, step S110 can be executed to switch the multimedia device 10 into the second video mute mode. In the warm video mute mode, the media retrieval is executed but the visual processing is stopped; although the arm video mute mode can save the processing power consumption, it is still bandwidth consuming, and the multimedia device 10 may have some delay when switching back to the video unmute mode.

After that, step S112 can be optionally executed to analyze the detection result of the foresaid detector. Similar to step S106, if the detection result does not conform to the specific switching condition, step S108 can be executed to keep in the current video mute mode. If the detection result conforms to the specific switching condition, step S114 can be executed to switch the multimedia device 10 into the third video mute mode. In the cold video mute mode, the media retrieval and the visual processing are not executed, and the multimedia device 10 may have some delay when switching back to the video unmute mode relative to the warm video mute mode. It should be noticed that the multimedia device 10 can be switched from any of the three video mute modes back to the video unmute mode, and further can be freely switched between the three video mute modes.

In conclusion, the multimedia device of the present invention can be switched between the video unmute mode and the video mute modes automatically or manually. The multimedia device can shut down the video data transmission between the processor and the panel in response to the video mute modes for saving the power and network bandwidth consumption. In the hot video mute mode, the multimedia device may still execute the media retrieval and the visual processing, to prepare for immediately displaying the visual content; in the warm video mute mode, the multimedia device may execute the media retrieval but not execute the visual processing, to further decrease the unnecessary power consumption; in the cold video mute mode, the multimedia device may not execute the media retrieval and the visual processing to both decrease the power and the unnecessary network bandwidth consumption.

Comparing to the prior art, the present invention can provide the video mute and unmute to enable new user experience for listening but not watching the video content. The present invention cannot only preserve the user multimedia experience when the network bandwidth becomes limited, but also make the multimedia device a focal platform for experiencing both the video and audio content.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques-such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multimedia device configured to process video data in a playback session, the multimedia device comprising a processor in communication with a panel, the processor being configured to receive audio data throughout the playback session, the processor being further configured to execute media retrieval and visual processing of the video data, output the video data to the panel when being in or switched into a video unmute mode, and further to output the audio data from an audio buffer, wherein the processor is configure to:
in response to the processor being in or switched into a first video mute mode, execute media retrieval and visual processing of the video data and not output the video data to the panel throughout the first video mute mode: wherein the processor is further configured to:
in response to the processor being in or switched into a second video mute mode, execute media retrieval of the video data and not execute visual processing of the video data and not output the video data to the panel; and
in response to the processor being in or switched into a third video mute mode, not execute media retrieval and visual processing of the video data and not output the video data to the panel.

2. A multimedia device configured to process video data in a playback session, the multimedia device comprising a processor in communication with a panel, the processor being configured to receive audio data throughout the playback session, the processor being further configured to execute media retrieval and visual processing of the video data, output the video data to the panel when being in or switched into a video unmute mode, and further to output the audio data from an audio buffer, wherein the processor is configured to:
in response to the processor being in or switched into a first video mute mode, execute media retrieval and visual processing of the video data and not output the video data to the panel;
in response to the processor being in or switched into a second video mute mode, execute media retrieval of the video data and not execute visual processing of the video data and not output the video data to the panel; and
in response to the processor being in or switched into a third video mute mode, not execute media retrieval and visual processing of the video data and not output the video data to the panel.

3. The multimedia device of claim 1, wherein the processor is further configured to shut down data transmission between the panel and a frame buffer in response to the first video mute mode.

4. The multimedia device of claim 1, wherein the processor is further configured to dim a backlight module of the panel, and to turn off the backlight module, a power supply and a timing controller of the panel in response to the first video mute mode.

5. The multimedia device of claim 1, wherein the processor is further configured to execute media retrieval in response to the second video mute mode.

6. The multimedia device of claim 1, wherein the processor is further configured to receive the video data via a network connector, and to limit data transmission between a data memory and a video decoder in response to the second video mute mode.

7. The multimedia device of claim 6, wherein the processor is further configured to stop video decoding via the video decoder and feed the video data into a video buffer and a frame buffer.

8. The multimedia device of claim 6, wherein the processor is further configured to shut down data transmission between the panel and a frame buffer.

9. The multimedia device of claim 1, wherein the processor is further configured to stop downloading the video data via a video downloader in response to the third video mute mode.

10. The multimedia device of claim 1, wherein the processor is further configured to stop video decoding via the video decoder and stop feeding the video data into a video buffer and a frame buffer in response to the third video mute mode.

11. The multimedia device of claim 1, wherein the processor is further configured to shut down data transmission between the panel and a frame buffer in response to the third video mute mode.

12. The multimedia device of claim 1, wherein the processor is further configured to analyze a label of the video data for triggering the first video mute mode.

13. The multimedia device of claim 1, wherein the processor is further configured to switch the panel into the video unmute mode or the first video mute mode according to a pre-selected time interval.

14. The multimedia device of claim 13, wherein the processor is further configured to switch the panel into the video unmute mode or the first video mute mode according to a pre-selected time interval and a detection result provided by an object detector.

15. The multimedia device of claim 1, wherein the processor is further configured to switch the panel from the first video mute mode to the second video mute mode when the processor does not receive an unmute command within a predetermined time interval.

16. A method, comprising:
receiving audio data throughout a playback session;
executing media retrieval and visual processing of video data;
outputting the video data to a panel in response to being in or switched into a video unmute mode;
outputting the audio data from an audio buffer;
in response to being in or switched into a first video mute mode, executing media retrieval and visual processing of the video data, and not outputting the video data to the panel throughout the first video mute mode;
in response to being in or switched into a second video mute mode, executing media retrieval of the video data and not executing visual processing of the video data and not outputting the video data to the panel; and
in response to being in or switched into a third video mute mode, not executing media retrieval and visual processing of the video data, and not outputting the video data to the panel.

17. The method of claim 16, further comprises shutting down data transmission between the panel and a frame buffer in response to the first video mute mode.

18. The method of claim 2, further comprises receiving the video data via a network connector, and limiting data transmission between a data memory and a video decoder in response to the second video mute mode.

19. The method of claim 2, further comprises stopping the video data from downloading via a video downloader in response to the third video mute mode.

* * * * *